UNITED STATES PATENT OFFICE.

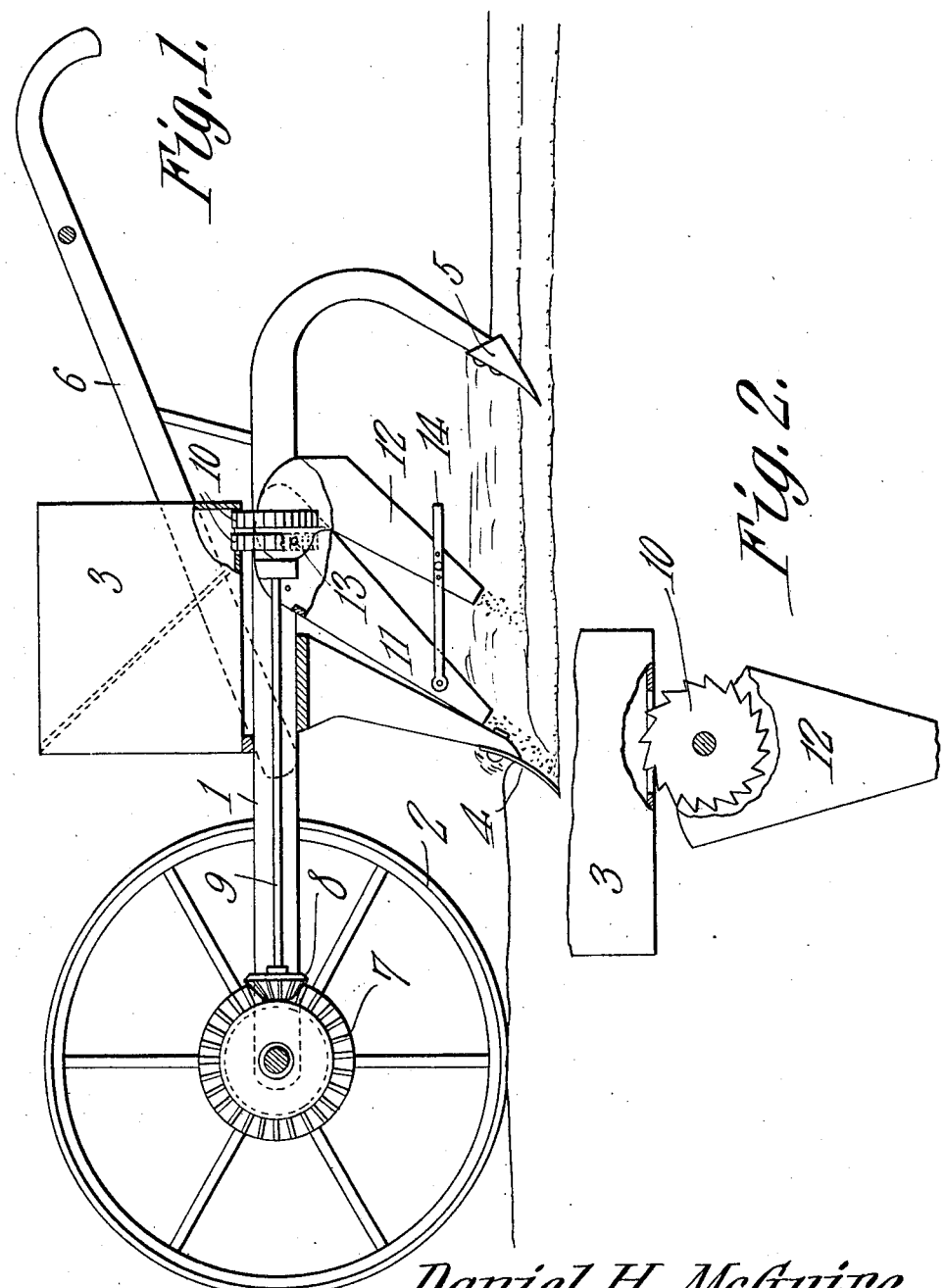

DANIEL HARRY McGUIRE, OF WHARTON, TEXAS.

SEED-PLANTER.

No. 872,363.  Specification of Letters Patent.  Patented Dec. 3, 1907.

Application filed May 31, 1907. Serial No. 376,542.

*To all whom it may concern:*

Be it known that I, DANIEL HARRY McGUIRE, a citizen of the United States, residing at Wharton, in the county of Wharton and State of Texas, have invented a new and useful Seed-Planter, of which the following is a specification.

This invention has relation to seed planters and it consists in the novel construction and arrangement of its parts as hereinafter shown and described.

The object of the invention is to provide an implement especially adapted to plant cotton seed to advantage but it may be employed for planting other kinds of seed, if desired.

With this planter a furrow is opened in the usual manner and a stream of seed is deposited directly upon the bottom of the furrow and immediately behind the furrow opener. Some loose earth then falls upon the seed thus deposited (said earth descending by gravity from the sides of the furrow). A second stream of seed is deposited upon the earth covering the first stream and the two streams at different depths in the soil are covered by the covering elements of the planter. Thus two separated lines of seed are placed in the soil at different distances from the surface thereof and the lower line of seed being in moist soil will come up without delay, unless a hard rain falls and packs the ground so it cannot come up, thus destroying them, in that case the upper line of seed will remain uninjured, being warmed by the sun will come up without delay, thus, saving the expense incidental to replanting in order to secure a stand.

In the accompanying drawing:—Figure 1 is a side elevation of the planter with parts broken away. Fig. 2 is a rear elevation of the lower part of the hopper thereof with parts broken away.

The planter consists of the frame 1, the forward portion of which is supported by the ground wheel 2. The hopper 3 is mounted upon the frame and the furrow opener 4 is attached to the frame preferably below the hopper 3. The furrow closers 5 are attached to the rear portion of the frame 1. The handles 6 are attached to the frame 1. The beveled gear wheel 7 is concentrically mounted upon the wheel 2 and the bevel pinion 8 meshes with the wheel 7. The pinion 8 is fixed to the shaft 9 which is journaled for rotation under the hopper 3. The rear portion of the shaft 9 is provided with a plurality of serrated feed wheels 10 which operate in the bottom of the hopper 3. The forward chute
11 is located under the forward feed wheel 10 while the rear chute 12 is located under the rear feed wheel 10. The chute 12 is pivoted to the chute 11 at the point 13 or the said chute 12 may be pivotally attached at its upper end to the frame 1 as desired. The upper end of the chute 11 is fixed to the frame 1 and the lower end of the said chute terminates immediately behind the furrow opener 4. The lower end of the chute 12 is spaced from the lower end of the chute 11 and the distance between the lower ends of the said chutes may be regulated by means of a bar 14 or its equivalent. The said bar is attached at its forward end to the chute 11 and at its rear end may be adjustably attached to the chute 12. The upper ends of the chutes 11 and 12 are adjacent each other and preferably are in close contact. The chute 11 is preferably longer than the chute 12.

The implement operates as follows:—As it is drawn along the ground the furrow opener 4 opens a furrow in the soil. At the same time, the shaft 9 is rotated through the co-action of the ground wheel 2, beveled gear wheels 7 and pinion 8. Thus the serrated feed wheels 10 turn in the bottom of the hopper 3 and separate the seed from the bulk thereof. The said wheels 10 deposit the separated seed in the chutes 11 and 12. The seed flows through the chute 11 in a stream and is deposited directly upon the bottom of the furrow, immediately behind the furrow opener 4. As the implement moves along some of the earth from the sides of the furrow slips down and lies upon the seed deposited by the chute 11. The seed that flows through the chute 12 falls upon this earth and consequently it is planted nearer the surface of the soil. The furrow closers 5 throw the earth upon both lines of seed in the furrow and thus two separate lines of seed are simultaneously planted in the ground at different distances from the surface thereof.

The object in providing a means for adjusting the space between the lower ends of the chutes 11 and 12 is to provide means for regulating the distance between the two lines of seed in the ground. The nearer that the chute 12 is brought to the chute 11 the closer together will be the lines of seed in the ground; and the further apart the ends of the chutes are adjusted the further apart will be the lines of seed as there will be more time for the earth from the sides of the furrow to accumulate upon the first line of seed deposited.

Having described my invention what I claim as new and desire to secure by Letters-Patent is:—

1. A planter comprising a frame having a furrow opener and furrow closer, a chute terminating at its lower end behind the furrow opener, a chute located in alinement with the first said chute and having its lower end spaced from the lower end of the same, a seed hopper common to both chutes and means for feeding seed from the hopper into the chutes.

2. A planter comprising a frame having a furrow opener and furrow closer, a hopper mounted thereon, a chute having its lower end terminating behind the furrow opener, a second chute located behind the first said chute, means for adjusting the space between the lower ends of the chutes, and means for feeding seed from the hopper to the chutes.

3. A planter comprising a frame having a furrow opener and furrow closer, a hopper located thereon, a fixed chute attached thereto, a pivoted chute attached thereto, means for adjusting the space between said chutes and means for feeding seed from the hopper to the chutes.

In testimony that I claim the foregoing as my own, I have hereto affixed my signature in the presence of two witnesses.

DANIEL HARRY McGUIRE.

Witnesses:
 S. A. MARSH,
 G. C. GIFFORD.